(12) United States Patent
Sugimoto et al.

(10) Patent No.: US 10,968,666 B2
(45) Date of Patent: Apr. 6, 2021

(54) INSIDE HANDLE DEVICE FOR VEHICLE

(71) Applicant: ALPHA CORPORATION, Kanagawa (JP)

(72) Inventors: Koichiro Sugimoto, Yokohama (JP); Takao Toyama, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 30 days.

(21) Appl. No.: 16/393,443

(22) Filed: Apr. 24, 2019

(65) Prior Publication Data
US 2019/0249464 A1 Aug. 15, 2019

Related U.S. Application Data

(63) Continuation of application No. PCT/JP2017/039636, filed on Nov. 1, 2017.

(30) Foreign Application Priority Data

Nov. 1, 2016 (JP) .............................. JP2016-214078

(51) Int. Cl.
E05B 79/20 (2014.01)
E05B 79/06 (2014.01)
(Continued)

(52) U.S. Cl.
CPC ................. *E05B 79/20* (2013.01); *B60J 5/04* (2013.01); *E05B 79/06* (2013.01); *E05B 79/08* (2013.01);
(Continued)

(58) Field of Classification Search
CPC .......... E05B 79/00; E05B 79/06; E05B 79/08; E05B 85/12; E05B 85/13; E05Y 2201/68; E05Y 2900/531; B60J 5/00; B60J 5/04
(Continued)

(56) References Cited

U.S. PATENT DOCUMENTS 5,884,434 A * 3/1999 Dedrich ................. E05B 85/12
296/146.7
10,119,307 B2 * 11/2018 Sugimoto ............... E05B 79/08
(Continued)

FOREIGN PATENT DOCUMENTS

CN 201963043 U 9/2011
JP 2006-063542 A 3/2006
(Continued)

OTHER PUBLICATIONS

International Search Report issued in PCT/JP2017/039636; dated Jan. 23, 2018.
(Continued)

Primary Examiner — Suzanne L Barrett
(74) Attorney, Agent, or Firm — Studebaker & Brackett PC

(57) ABSTRACT

An inside handle device for vehicle includes a handle unit and a cable unit. In the handle unit, an operation handle including a connecting recess is rotatably connected to a handle base. The cable unit is connected to the handle unit while holding one end of an operating force transmission cable in which an inner cable is movably inserted into an outer cable. The connecting recess is locked to a connecting body formed at a tip end of the inner cable in a state where the handle unit is connected to the cable unit.

3 Claims, 10 Drawing Sheets

(51) Int. Cl.
   *E05B 85/12* (2014.01)
   *E05B 79/08* (2014.01)
   *B60J 5/04* (2006.01)
   *E05B 79/22* (2014.01)
(52) U.S. Cl.
   CPC .............. *E05B 79/22* (2013.01); *E05B 85/12* (2013.01); *E05B 85/13* (2013.01); *E05Y 2201/68* (2013.01); *E05Y 2900/531* (2013.01)
(58) Field of Classification Search
   USPC .......................................... 70/237; 292/336.3
   See application file for complete search history.

(56) References Cited

U.S. PATENT DOCUMENTS

| | | |
|---|---|---|
| 2011/0308172 A1 | 12/2011 | Schidan et al. |
| 2013/0168979 A1* | 7/2013 | Minemura ............... E05B 85/13 |
| | | 292/336.3 |
| 2016/0076275 A1 | 3/2016 | Uemura et al. |
| 2016/0369533 A1 | 12/2016 | Nagaoka et al. |
| 2017/0037663 A1 | 2/2017 | Sugimoto |

FOREIGN PATENT DOCUMENTS

| | | |
|---|---|---|
| JP | 2010-534589 A | 11/2010 |
| JP | 2014-227758 A | 12/2014 |
| JP | 2015-206234 A | 11/2015 |
| WO | 2015/136775 A1 | 9/2015 |
| WO | WO-2019151457 A1 * | 8/2019 ............. E05B 85/12 |

OTHER PUBLICATIONS

Written Opinion issued in PCT/JP2017/039636; dated Jan. 23, 2018.

The extended European search report issued by the European Patent Office dated May 29, 2020, which corresponds to European Patent Application No. 17866785.3-1005 and is related to U.S. Appl. No. 16/393,443.

An Office Action mailed by China National Intellectual Property Administration dated Jun. 24, 2020, which corresponds to Chinese Patent Application No. 201780066106.3 and is related to U.S. Appl. No. 16/393,443 with English language translation.

* cited by examiner

INSIDE HANDLE DEVICE FOR VEHICLE

CROSS REFERENCE TO RELATED APPLICATIONS

This application is a continuation of PCT application No. PCT/JP2017/039636, which was filed on Nov. 1, 2017 based on Japanese Patent Application No. 2016-214078 filed on Nov. 1, 2016, the contents of which are incorporated herein by reference.

TECHNICAL FIELD

The present invention relates to an inside handle device for vehicle.

BACKGROUND ART

Patent Literature 1: (JP-A-2010-534589) discloses an inside handle device for vehicle formed by connecting a handle unit incorporating an operation handle and a cable unit holding a cable device.

In an inside handle device for vehicle of Patent Literature 1, a handle unit is formed by rotatably connecting a lock opener (operation handle) to a door opener shell (handle base), and a cable unit is formed by holding one end of a Bowden cable (cable device) in a Bowden cable connection housing (cable cover).

Each of opposing wall surfaces provided on the cable cover is provided with an arc-shaped guide link, and a Bowden cable hook (connecting body) fixed to a tip end of the cable device is movably mounted such that both ends thereof are supported by the guide links.

In a state in which the cable unit is connected to the handle unit, a recess (connecting recess) formed in a leg of the operation handle is engaged with the straight rod-like connecting body, and thereafter, the cable device is driven by operating the operation handle.

CITATION LIST

[Patent Literature 1] JP-A-2010-534589

In the inside handle device of the vehicle of Patent Literature 1, in order to secure engagement of the connecting recess to the connecting body due to connecting operation between the cable unit and the handle unit, and to secure smooth operation of the connecting body, it is necessary to set a predetermined clearance between the wall surfaces on which the guide links are opened and the leg of the operation handle, and between the wall surfaces and both ends of the connecting body, whose value is integrated with a tolerance of a connection position or the like with respect to a handle base of the operation handle, and thus is generally not small.

On the other hand, since it is difficult to engage the connecting recess at a center position in a longitudinal direction of the connecting body formed in a straight rod shape, it is likely to cause a problem in followability of the connecting body to the operation handle.

That is, when a position shifted from the center of the connecting body becomes an action point from the connecting recess, a rotational force is generated in addition to a translational force to the connecting body. As a result, since the connecting body moves in an inclined posture, an excessive sliding contact force is generated between both ends of the connecting body and the guide links or the wall surfaces on which the guide links are formed, thereby causing an increase in an operating force of the operation handle, an automatic return failure, an insufficient stroke, or the like.

According to the embodiment of the present invention, operation reliability of an operation handle can be improved in an inside handle device for vehicle.

According to an embodiment, an inside handle device for vehicle includes a handle unit and a cable unit. In the handle unit, an operation handle including a connecting recess is rotatably connected to a handle base. The cable unit is connected to the handle unit while holding one end of an operating force transmission cable in which an inner cable is movably inserted into an outer cable. The connecting recess is locked to a connecting body formed at a tip end of the inner cable in a state where the handle unit is connected to the cable unit. The connecting body is formed of a solid rotating body having a straight line intersecting an axis of the inner cable as a rotation axis, and has a shape protruding laterally from the axis of the inner cable and having a diameter gradually decreasing from a center toward both ends in a protruding direction. The connecting recess includes a contact portion to both side wall portions of the connecting body sandwiching a maximum diameter portion of the connecting body.

The inside handle device is formed by connecting a cable unit 8 to which an operating force transmission cable 7 is connected and a handle unit 4 to which an operation handle 3 is connected; in a state in which both are connected to each other, a connecting recess 2 of the operation handle 3 is locked to a connecting body 9 formed at a tip end of the operating force transmission cable 7; and a latch device is remotely operated by operating the operation handle 3 via the operating force transmission cable 7.

In the embodiment of the present invention, the connecting body 9 is formed as a shaft-shaped rotating body having a rotation axis intersecting an axis of an inner cable 6 as the rotation center, and having a diameter maximum at a center and gradually decreasing toward both ends in a rotation axis direction. The connecting recess 2 on the operation handle 3 side includes a contact portion 10 in contact with both side wall portions of the connecting body 9 sandwiching a maximum diameter portion of the connecting body 9, and a force toward the maximum diameter portion is generated by the contact portion 10 of the connecting recess 2 to the rotating body in a state in which the connecting recess 2 is locked to the connecting body 9.

As a result, the connecting body 9 is always located at the center of the connecting recess 2, and operation of the connecting body 9 does not become difficult due to abutment of both ends of the connecting body 9 against a support of the connecting body 9, movement in an oblique posture, or the like.

Although the connecting body 9 may be formed into an abacus bead shape with truncated cones joined to bottom surfaces thereof, when formed into a convex barrel shape, since the lateral operating force increases gradually toward the maximum diameter portion, followability of the connecting body 9 to the connecting concave portion 2 is improved.

Although the connecting recess 2 only needs to be configured to contact the connecting body 9 in a linear shape or in a string shape of a prescribed width, if the contact portion 10 of the connecting recess 2 is formed by a curvature surface that matches the curvature of an outer peripheral wall surface of the connecting body 9 and contacts an entire surface of a corresponding portion of the connecting body 9, a wall surface of the connecting recess 2 is in contact a peripheral wall of the connecting body 9 substantially over the entire surface, so that the connecting body 9 has higher followability to the connecting recess 2.

According to the embodiment of the present invention, it is possible to improve operation reliability of an operation handle in order to improve followability of a connecting body with respect to a connecting recess of the operation handle.

DESCRIPTION OF EMBODIMENTS

Figure 1A:
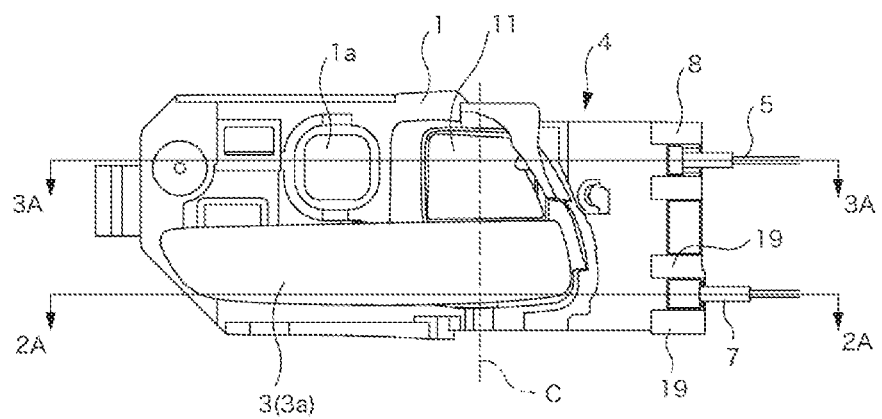
FIG. 1A is a front view of the inside handle device.

An inside handle device is formed by connecting a cable unit 8 to an inside surface of a handle unit 4. In the present specification, on the basis of an attachment posture to a vehicle, a left side in FIG. 1A is referred to as "front", a front side in FIG. 1A is referred to as "outside", and a rear side in FIG. 1A is referred to as "inside".

Figure 4A:
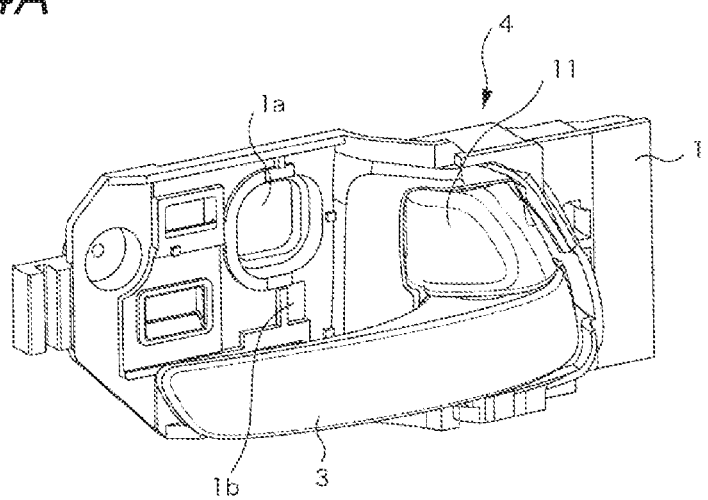
FIG. 4A is a perspective view of a handle unit.
Figure 4B:
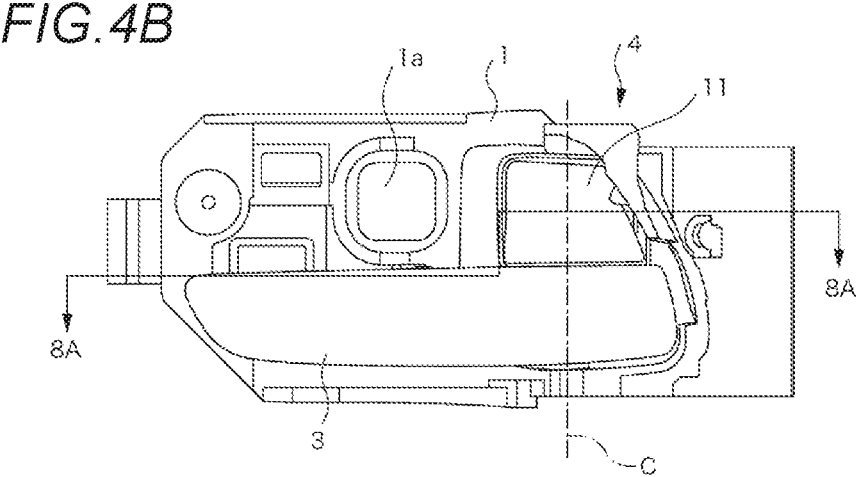
FIG. 4B is a front view of the handle unit.

As shown in FIGS. 4A and 4B, the handle unit 4 is formed by rotatably connecting an operation handle 3 and a lock knob 11 to a handle base 1 around a rotation center (C).

Figure 5:
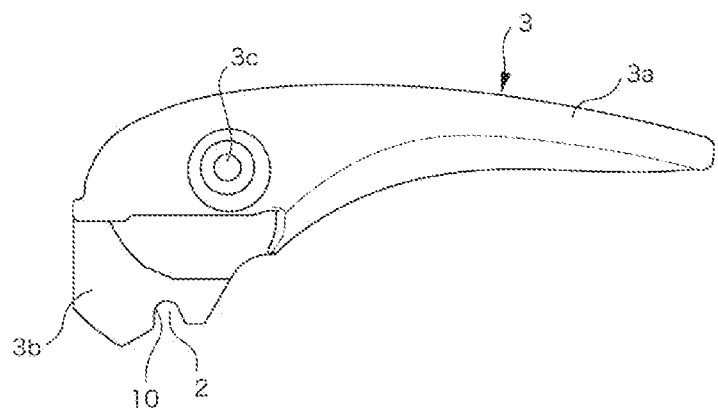
FIG. 5 is a top view showing an operation handle.

As shown in FIG. 5, the operation handle 3 includes a handhold portion 3a and an operation leg portion 3b, and a connecting recess 2 is formed at a free end of the operation leg 3b to lock a connecting body 9 described later.

Figure 2:
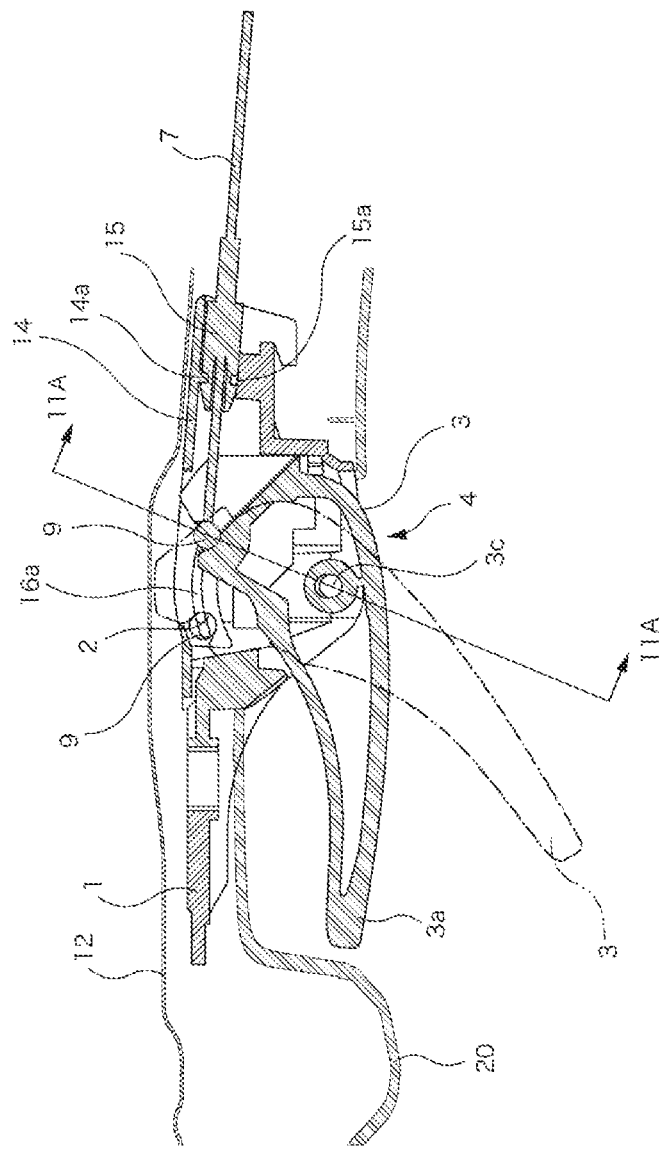
FIG. 2 is a cross-sectional view taken along a line 2A-2A of FIG. 1A.
Figure 3:
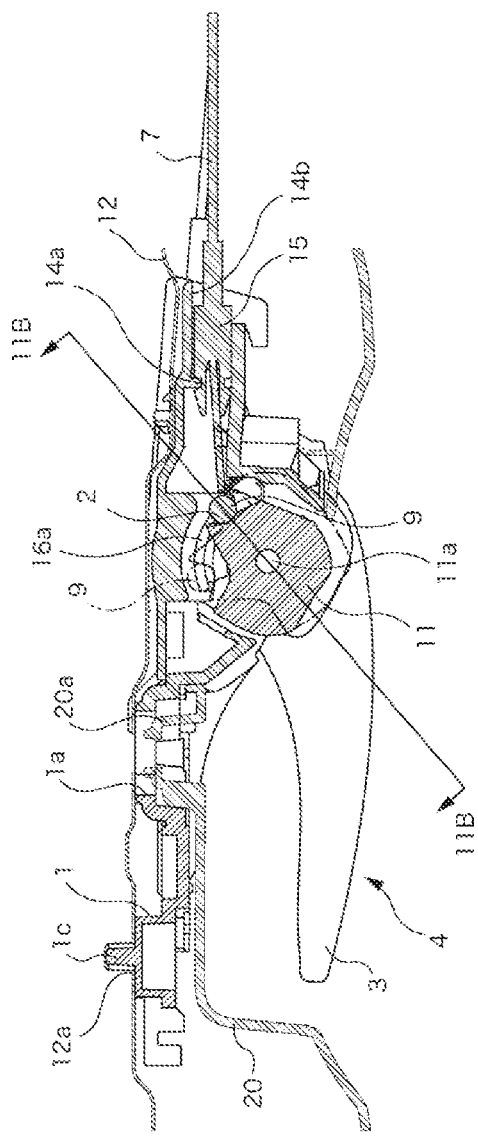
FIG. 3 is a cross-sectional view taken along a line 3A-3A of FIG. 1A.

The operation handle 3 is rotated between an initial rotational position shown by a solid line and an operative rotational position shown by a chain line in FIGS. 2 and 3 around a shaft insertion hole 3c opened on a border between the handhold 3a and the operation leg 3b as a rotation center (C), and is biased toward the initial rotational position by a torsion spring which is not shown in FIGS. 2 and 3.

Figure 6A:
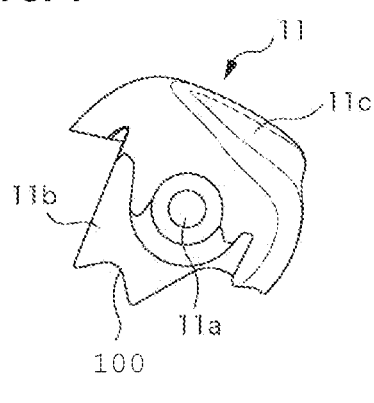
FIG. 6A is a side view of a lock knob.
Figure 6B:
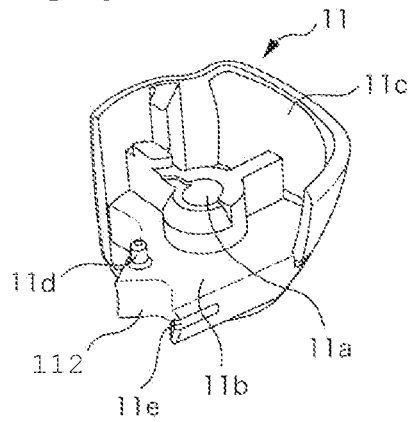
FIG. 6B is a perspective view of the lock knob.

As shown in FIGS. 6A and 6B, the lock knob 11 is formed with a cover 11c extended to an outside peripheral edge of the hinge piece 11b on which a shaft insertion hole 11a is formed, and a connecting recess 2 similar to the operation handle 3 is provided at a free end of the hinge piece 11b. The lock knob 11 is rotated between the initial rotational position shown by the solid line and the operative rotational position shown by the chain line in FIGS. 2 and 3 around the shaft insertion hole 11a as a rotation center (C). The hinge piece 11b is provided with a drive protrusion 11d protruding in a direction parallel to the shaft insertion hole 11a and a cable insertion groove 11e through which the inner cable 6 of the operating force transmission cable 7 is inserted.

The above-described handle base 1 holding the operation handle 3 and the lock knob 11 is provided with a fixing opening 1a to an inner panel 12 of a door and a locking opening 1b for locking a second locking portion 13 of the cable unit 8, which will be described later.

Figure 7A:
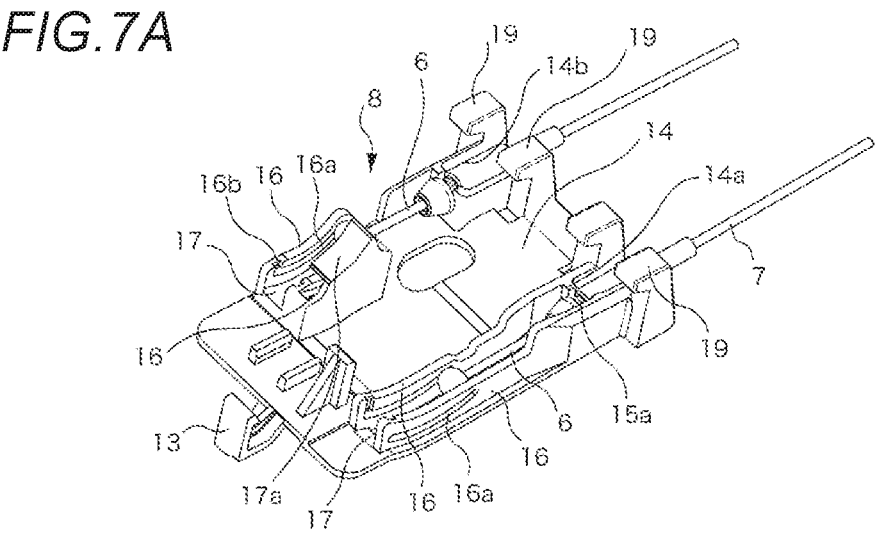
FIG. 7A is a perspective view of a cable unit as viewed from the front.
Figure 7B:
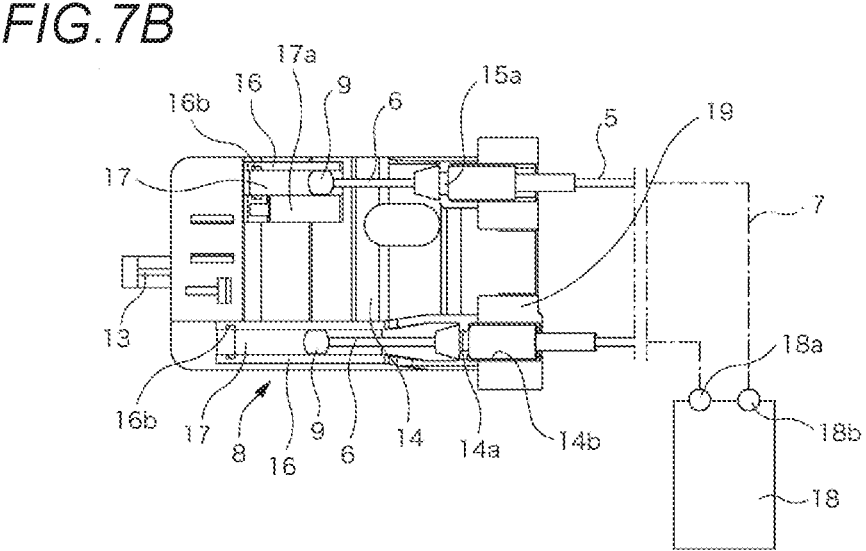
FIG. 7B is a front view of the cable unit.
Figure 9A:
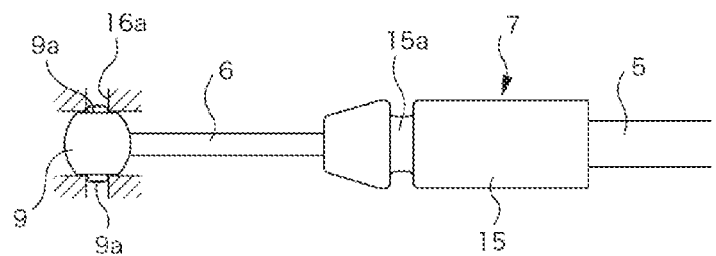
FIG. 9A is a diagram showing a connecting body.

On the other hand, as shown in FIGS. 7A and 7B, the cable unit 8 is formed by holding one end of each operating force transmission cable 7 on the cable cover 14. As shown in FIG. 9A, the operating force transmission cables 7 are formed by inserting the inner cables 6 through outer cables 5 in a movable manner; connecting bodies 9 are fixed to tip ends of the inner cables 6; and end pipes 15 including fitting grooves 15a are fixed to tip ends of the outer cables 5.

As shown in FIGS. 7A and 7B, on the cable cover 14, connecting body guide recesses 17 are formed between guide walls 16 protruding in the outside direction and opposing one another. Two sets of the connecting body guide recesses 17 are formed corresponding to the operation handle 3 and the lock knob 11 of the handle unit 4 in a state in which the cable unit 8 is connected to the handle unit 4.

The connecting body guide recesses 17 are formed to have a width dimension slightly larger than a distance between both end surfaces of the connecting bodies 9 of the operating force transmission cables 7, and guide holes 16a having a long hole shape are formed on each of the guide walls 16. Each guide hole 16a is formed in an arc shape that matches a movement locus of the corresponding connecting recess 2 of the operation handle 3 and the lock knob 11 of the handle unit 4.

The cable cover 14 is provided with cable clip pieces 14a and cable holding portions 14b following the cable clip pieces 14a on a rear side, and the operating force transmission cables 7 are mounted at predetermined positions on the cable cover 14 by fitting the front ends of the outer cables 5 into the cable holding portions 14b and inserting the cable clip pieces 14a into the fitting grooves 15a of the end pipes 15.

Guide projections 9a of the connecting bodies 9 of the inner cables 6 pulled out from the outer cable 5, which will be described later, are movably fitted into the guide holes 16a. In order to introduce the guide projections 9a of the connecting bodies 9 into the guide holes 16a, introduction openings 16b are formed on the guide walls 16.

The other end of each operating force transmission cable 7, whose one end is held on the cable cover 14 as described above, is connected in advance to the latch device 18 fixed to the door. In FIG. 7B, the operating force transmission cable 7 corresponding to the operation handle 3 shown in the lower part is connected to a latch operation portion 18a of the latch device 18, and the operating force transmission cable 7 corresponding to the lock knob 11 shown in the upper part is connected to a lock operation portion 18b of the latch device 18. In this state, the lock operation portion 18b is held in an unlocked state, and when an input to the latch operation portion 18a is given, a latch release operation is performed, the lock operation portion 18b transitions to a locked state, and afterward, latch release operation via operation to the latch operation portion 18a is prohibited.

A drive piece 17a is provided on a side of the connecting body guide recess 17 corresponding to the lock knob 11. As shown in FIGS. 7A and 7B, the driving piece 17a is provided in an eaves shape so that an edge thereof is located along a center side edge of the connecting body guide recess 17.

A second locking portion 13 and first locking portions 19 are provided at the front and rear ends of the cable cover 14. The second locking portion 13 is formed in a hook shape by extending rearward from an inside surface of the front end edge of the cable cover 14, and then extending to the outside, with a tip end thereof protruding rearward. The second locking portion 13 is formed to be elastically deformable, and in the present embodiment, the cable cover 14 is formed of a synthetic resin material to use elasticity thereof.

The first locking portions 19 are provided so as to protrude from a rear end edge of the cable cover 14 to the outside, and are formed with protrusions protruding forward from free ends thereof. As will be described later, the first locking portions 19 form a rotation center during connection operation to the handle unit 4, and are formed to have an appropriate volume so as not to be easily elastically deformed or broken.

Figure 8A:
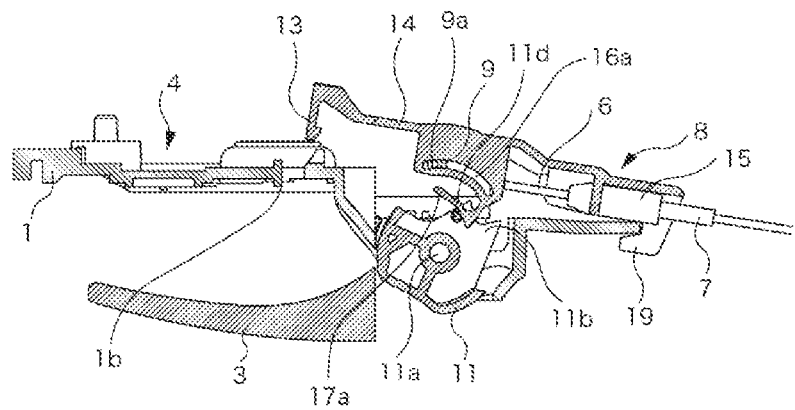
FIG. 8A is a diagram showing a state in which a first locking portion in a line 8A-8A of FIG. 4B showing a connecting process of the cable unit is locked.

Connection of the cable unit 8 formed as described above to the handle unit 4 is performed by locking the first locking portion 19 from the inside to the rear end edge of the handle base 1 and then rotating counterclockwise in FIG. 8A.

As described above, when the operating force transmission cable 7 is connected to the latch device 18 in advance, the connecting body 9 of the operating force transmission cable 7 connected to the latch operation portion 18a held in an non-input state is held at a non-input corresponding position of the latch operation portion 18a, which corresponds to the initial rotational position of the operation handle 3 biased by the torsion spring, and thus the connecting body 9 is fitted into the connecting recess 2 of the operation handle 3 in accordance with the rotation operation of the cable unit 8.

On the other hand, the lock knob 11, whose rotational position is not regulated by the handle unit 4 alone, is guided by the drive protrusion and the drive piece 17a to a fitting position with the connecting body 9 held at a position that is uniquely determined by the state of the lock operation portion 18b.

That is, in the present embodiment in which the lock operation portion 18b of the latch device 18 is held at an unlock position, when the lock knob 11 is not at the initial rotational position, during rotation operation of the cable unit 8, the drive piece 17a comes into contact with the drive projection to move the lock knob 11 to the initial rotational position, and then the connecting body 9 is fitted into the connecting recess 2 of the lock knob 11.

Figure 1B:
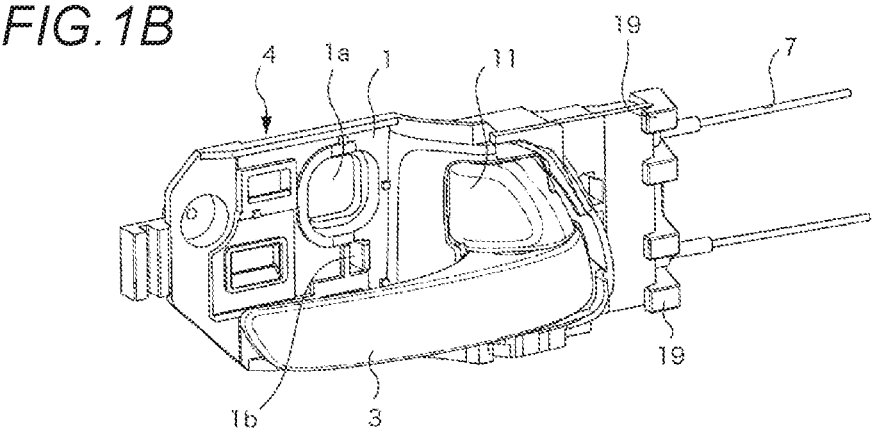
FIG. 1B is a perspective view of the inside handle device.
Figure 8B:
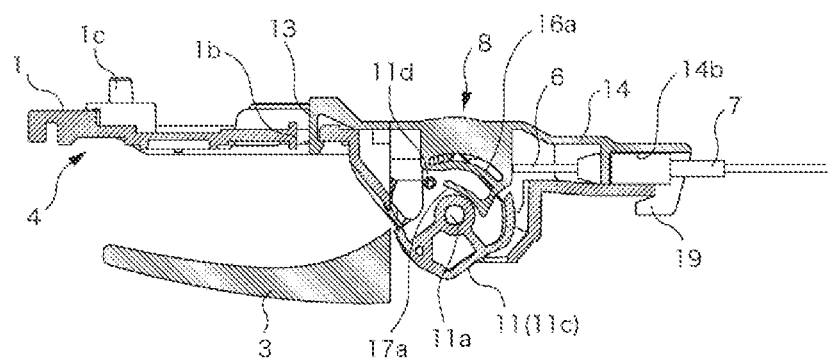
FIG. 8B is a diagram showing a connection completion state in the line 8A-8A of FIG. 4B showing the connecting process of the cable unit.

When the cable unit 8 is rotated with respect to the handle unit 4 as described above, the second locking portion 13 of the cable unit 8 is eventually locked elastically to the locking opening 1b of the handle base 1 to complete the connection operation of both. The locking opening 1b is disposed at a position visible from the surface of the handle unit 4, and as shown in FIG. 1B and FIG. 8B, since the surface of the second locking portion 13 is exposed from the locking opening 1b to the surface in the connected state, incomplete locking state can be detected only by viewing the exposure state, and detachment of the cable unit 8 due to locking failure can be completely prevented.

FIGS. 9A to 9E show details of the above-described connecting body 9 and connecting recess 2. As described above, the connecting body 9 is fixed to the tip end of the inner cable 6 of the operating force transmission cable 7, and is held on the cable cover 14 with the guide projections 9a protruding from both end faces movably inserted into the guide holes 16a of the cable cover 14.

The connecting body 9 is a barrel-shaped solid rotating body formed by using an arc as a generating line and rotating the arc around a rotation axis (CR) deviated from a center of the arc on a surface to which an arc belongs, which has a thick central portion and has a diameter gradually decreasing toward both ends, and is formed by arranging the guide projections 9a on the rotation axis (CR).

On the other hand, the connecting recess 2 is formed in a notch shape opened in a front-rear direction (an up-down direction in FIG. 9D) with a curvature surface whose inner wall coincides with the peripheral wall of the above-described connecting body 9.

According to the above configuration, when the cable unit 8 is connected to the handle unit 4, in a case where a maximum curvature portion of the connecting body 9, that is, a widthwise center thereof, does not coincide with a widthwise center of the connecting recess 2, the connecting body 9 obtains an operating force in a width direction from the peripheral wall of the connecting recess 2, and thus the outer peripheral wall surface thereof moves to a position in close contact with the inner peripheral wall of the connecting recess 2. As a result, the connecting body 9 moves following the connecting recess 2 in a moving direction of the connecting recess 2, and thus moves completely following the moving direction of the connecting recess 2 without moving obliquely, which prevents occurrence of a stroke loss, or loss of the operating force due to contact of the end surfaces of the connecting body 9 with the guide walls 16 supporting the connecting body 9.

Figure 9B:
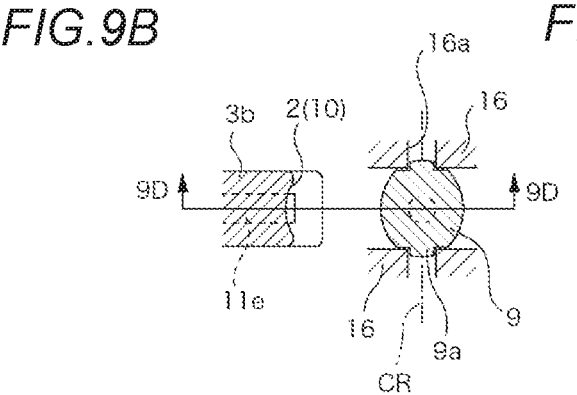
FIG. 9B is a cross-sectional view taken along a line 9B-9B of FIG. 9D showing a connection process of the connecting body to a connecting recess.
Figure 9C:
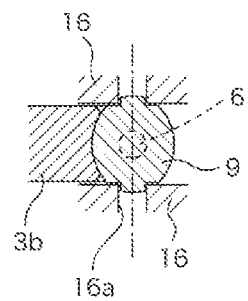
FIG. 9C is a cross-sectional view showing a connection completion state of FIG. 9B.
Figure 9D:
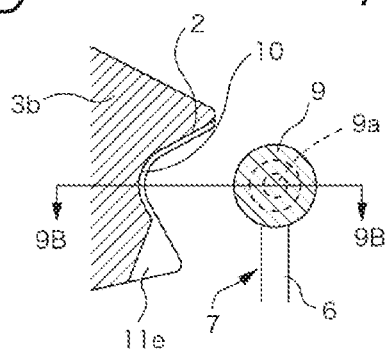
FIG. 9D is a cross-sectional view taken along a line 9D-9D of FIG. 9B showing the connection process of the connecting body to the connecting recess.
Figure 9E:
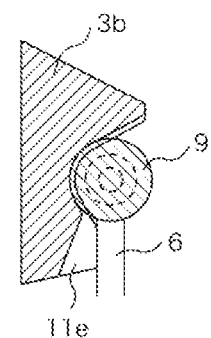
FIG. 9E is a cross-sectional view showing a connection completion state and a connection state of the connecting body and the connecting recess of FIG. 9D.
Figure 11A:
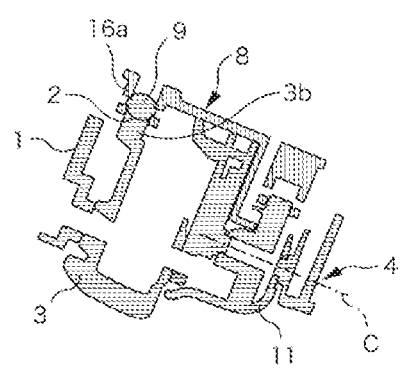
FIG. 11A is a cross-sectional view taken along a line 11A-11A of FIG. 2.
Figure 11B:
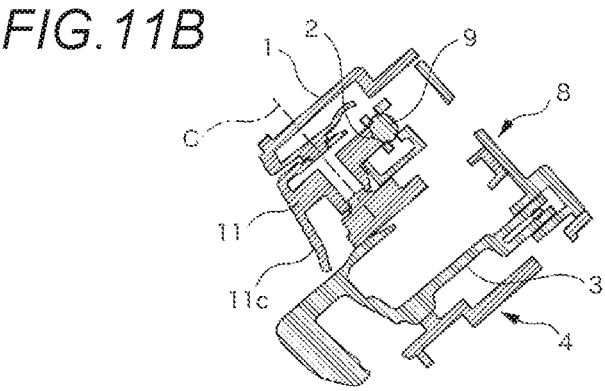
FIG. 11B is a cross-sectional view taken along a line 11B-11B of FIG. 3.

In particular, as shown in FIGS. 9B, 11A and 11B, since the operation leg 3b of the operating handle 3 or the hinge piece 11b of the lock knob 11 are configured to enter between the guide walls 16 to drive the connecting body 9, and in the present embodiment in which the connecting body 9 is guided to the center of the operation leg 3b or the like by the connecting recess 2 formed on the operation leg 3b or the like, contact of the end face of the connecting body 9 with the guide wall 16 can be reliably prevented.

Figure 10A:
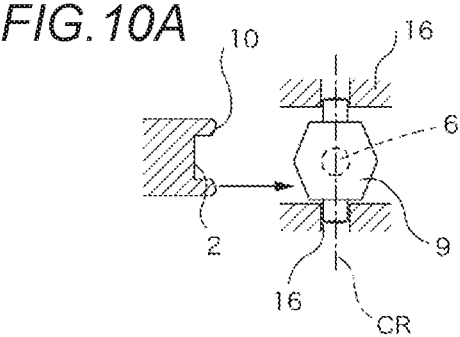
FIG. 10A is a diagram showing a modification of FIG. 9B.
Figure 10B:
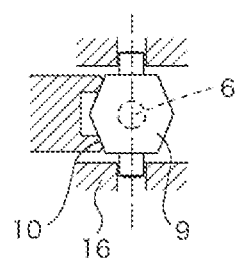
FIG. 10B is a diagram showing a modification of FIG. 9C.

Although the connecting body 9 is formed in a barrel shape in the above description, as shown in FIGS. 10A and 10B, the connecting body 9 can be formed into an appropriate shape as long as it has a shape having a high center and having a diameter gradually decreasing toward both ends. In this case, the contact portion 10 of the connecting recess 2 to the connecting body 9 is formed to be in contact with the entire surface of the corresponding portion with respect to the connecting body 9, but may also be configured such that a part of the connecting recess 2 is in contact with the connecting body 9 in a strip shape at a plurality of positions with a center therebetween, as shown in FIGS. 10A and 10B.

Figure 12A:
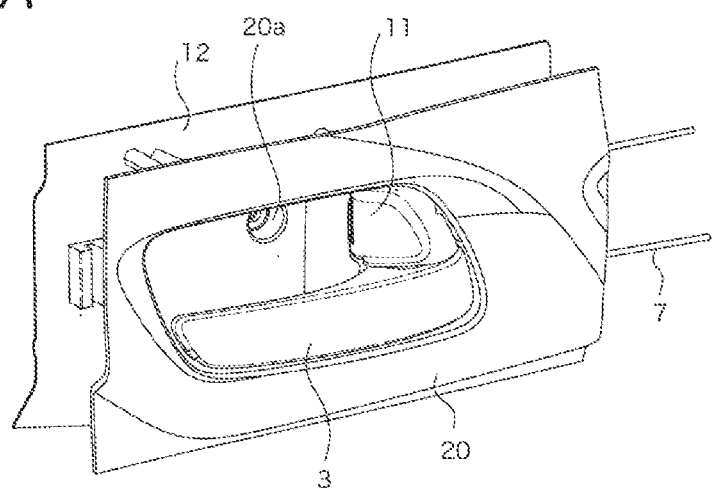
FIG. 12A is a perspective view showing a state during attachment of the inside handle device.
Figure 12B:
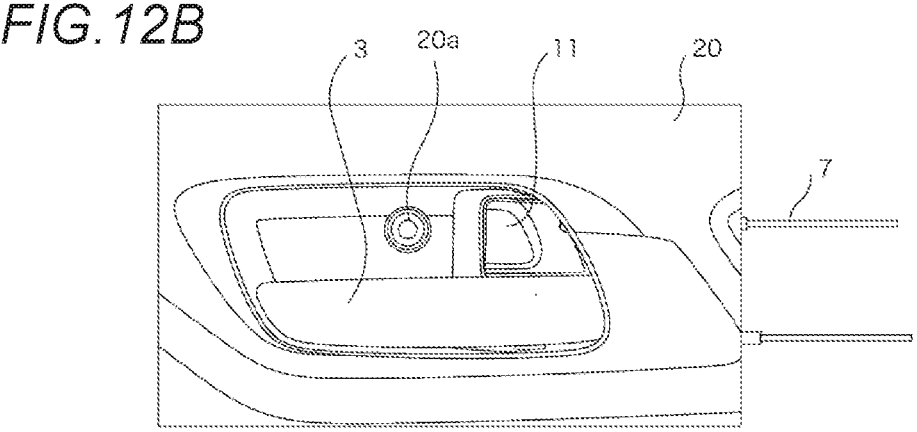
FIG. 12B is a perspective view showing an attachment completion state of the inside handle device.

As described above, the inside handle device in which the cable unit 8 is connected to the handle unit 4 is fixed in a state of being sandwiched between a door trim 20 and the inner panel 12 of the door, as shown in FIGS. 2, 3, and 12. In the present embodiment, fixing operation of the inside handle device is performed by incorporating the inside handle device into the door trim 20 in advance, and then screwing a fastening element (not shown) into a fixing portion 20a of the door trim 20 fitted into the fixing opening 1a of the handle base 1.

In a state where the door trim 20 is fixed, as shown in FIG. 3, a positioning projection 1c protruding from the inside of the handle base 1 is fitted into the positioning hole 12a of the inner panel 12 and is positioned with respect to the inner panel 12, and when the operation handle or the lock knob 11 is rotated in this state, the connecting body 9 fitted to each connecting recess 2 is driven, and the latch device 18 can be remotely operated.

Although the invention has been described in detail with reference to specific embodiments, it will be apparent to those skilled in the art that various changes and modifications can be made without departing from the spirit and scope of the invention.

This application is based on Japanese patent application 2016-214078, filed Nov. 1, 2016, the contents of which are incorporated herein by reference.

REFERENCE SIGNS LIST

1 Handle base
2 Connecting recess
3 Operation handle
4 Handle unit
5 Outer cable
6 Inner cable
7 Operating force transmission cable
8 Cable unit
9 Connecting body
10 Contact portion

The invention claimed is:

1. An inside handle device for vehicle comprising: a handle unit; and a cable unit, wherein in the handle unit, an operation handle including a connecting recess is rotatably connected to a handle base, the cable unit is connected to the handle unit while holding one end of an operating force transmission cable in which an inner cable is movably inserted into an outer cable, the connecting recess is locked to a connecting body formed at a tip end of the inner cable in a state where the handle unit is connected to the cable unit, the connecting body is formed of a solid rotating body having a straight line intersecting an axis of the inner cable as a rotation axis, and has a shape protruding laterally from the axis of the inner cable and having a diameter gradually decreasing from a center toward both ends in a protruding direction, and the connecting recess includes a contact portion in contact with both side wall portions of the connecting body sandwiching a maximum diameter portion of the connecting body wherein the both side wall portions of the connecting body constitute two side wall portions formed on opposite sides of the maximum diameter portion of the connecting body so as to sandwich the maximum diameter portion, the two side wall portions each having a diameter that is less than a diameter of the maximum diameter portion of the connecting body, and the contact portion is in contact with both side wall portions of the connecting body.

2. The inside handle device for vehicle according to claim 1, wherein the connecting body is formed into a convex barrel shape.

3. The inside handle device for vehicle according to claim 1, wherein the contact portion of the connecting recess has a curvature surface matching a curvature of an outer peripheral wall surface of the connecting body, and contacts an entire surface of a corresponding portion of the connecting body.

* * * * *